United States Patent
Tsang et al.

(10) Patent No.: US 11,697,512 B2
(45) Date of Patent: Jul. 11, 2023

(54) SYSTEM AND METHOD FOR DATA RECORDING AND TRANSMISSION FOR PROPELLER BALANCING

(71) Applicant: PRATT & WHITNEY CANADA CORP., Longueuil (CA)

(72) Inventors: Jennifer Erin Tsang, North York (CA); John Peter O'Malley, III, North Attleboro, MA (US); Peter Lee, Quincy, MA (US); Robert Wigny, Bolton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 325 days.

(21) Appl. No.: 17/073,942

(22) Filed: Oct. 19, 2020

(65) Prior Publication Data

US 2022/0119131 A1  Apr. 21, 2022

(51) Int. Cl.
| | | |
|---|---|---|
| *B64F 5/60* | (2017.01) | |
| *G01M 1/22* | (2006.01) | |
| *G01M 5/00* | (2006.01) | |
| *B64D 45/00* | (2006.01) | |

(52) U.S. Cl.
CPC .......... *B64F 5/60* (2017.01); *G01M 1/22* (2013.01); *G01M 5/0066* (2013.01); *B64D 2045/0085* (2013.01)

(58) Field of Classification Search
CPC ......... B64F 5/60; G01M 1/22; G01M 5/0066; B64D 2045/0085; B64C 11/008
See application file for complete search history.

(56) References Cited

U.S. PATENT DOCUMENTS

| | | | | |
|---|---|---|---|---|
| 2,362,842 A | * | 11/1944 | Mueller | G01M 1/28 |
| | | | | 73/463 |
| 3,490,556 A | * | 1/1970 | Bennett, Jr. | B64C 1/40 |
| | | | | 181/207 |
| 3,680,363 A | * | 8/1972 | Holz | G05D 13/62 |
| | | | | 73/660 |
| 4,112,774 A | * | 9/1978 | Chadwick | G01M 1/30 |
| | | | | 73/147 |
| 5,069,071 A | * | 12/1991 | McBrien | G01H 11/06 |
| | | | | 73/659 |
| 5,450,760 A | * | 9/1995 | Lew | G01F 1/106 |
| | | | | 73/861.02 |
| 6,322,324 B1 | * | 11/2001 | Kennedy | B64C 27/008 |
| | | | | 416/500 |

(Continued)

FOREIGN PATENT DOCUMENTS

EP  3222516  9/2017

*Primary Examiner* — Mussa A Shaawat
(74) *Attorney, Agent, or Firm* — Norton Rose Fulbright Canada LLP

(57) ABSTRACT

A data recording and transmission method and system for use in balancing a propeller of an aircraft. The method comprises operating the propeller in-flight, receiving, during operation of the propeller in-flight, vibration data associated with the propeller, retrieving, from a non-volatile memory on-board the aircraft, configuration data associated with the propeller, and transmitting the vibration data and the configuration data to a data processing device configured to determine a balancing solution for the propeller based one the vibration data and the configuration data.

16 Claims, 4 Drawing Sheets

(56) References Cited

U.S. PATENT DOCUMENTS

| | | | |
|---|---|---|---|
| 6,505,143 B1* | 1/2003 | Lakshminarasimha | G05B 19/4065 702/56 |
| 7,243,023 B2* | 7/2007 | Skilton | G01M 1/22 318/128 |
| 7,321,809 B2* | 1/2008 | Vian | G05B 23/024 73/66 |
| 7,371,042 B2* | 5/2008 | Lee | F01D 5/027 416/500 |
| 7,572,101 B2 | 8/2009 | Mickol et al. | |
| 7,957,851 B2* | 6/2011 | Braswell | F01D 5/027 701/31.4 |
| 8,473,176 B2* | 6/2013 | Youngquist | G01K 7/021 123/294 |
| 8,682,509 B2* | 3/2014 | Goodrich | G05B 23/0283 701/14 |
| 8,812,255 B2* | 8/2014 | Lynch | B64C 27/008 702/89 |
| 8,914,205 B2* | 12/2014 | Chandran | G05B 23/0283 701/99 |
| 9,694,915 B1* | 7/2017 | Wirth | B64C 11/008 |
| 9,758,243 B1 | 9/2017 | Potts et al. | |
| 10,145,265 B2* | 12/2018 | Skilton | B64D 27/12 |
| 10,233,907 B2* | 3/2019 | Asheim | G05B 17/02 |
| 10,403,059 B2 | 9/2019 | Moravek et al. | |
| 2009/0263247 A1* | 10/2009 | Mollmann | G01H 1/006 702/56 |
| 2009/0301055 A1* | 12/2009 | Kallappa | F02C 7/00 73/660 |
| 2009/0306829 A1* | 12/2009 | Hildebrand | B64C 11/008 700/279 |
| 2009/0306839 A1* | 12/2009 | Youngquist | G01K 7/021 73/114.26 |
| 2011/0189017 A1* | 8/2011 | Saucray | B64C 11/008 416/144 |
| 2011/0208361 A1* | 8/2011 | Hildebrand | G05B 19/404 700/280 |
| 2013/0000314 A1* | 1/2013 | McCaffrey | F01D 13/003 60/773 |
| 2014/0090472 A1* | 4/2014 | Lysen | G01H 1/003 73/587 |
| 2014/0145025 A1* | 5/2014 | Fang | B64C 27/008 244/17.11 |
| 2014/0150550 A1* | 6/2014 | Borwankar | G01M 1/22 73/455 |
| 2016/0032725 A1* | 2/2016 | Heidari | F01D 5/027 701/33.1 |
| 2017/0174316 A1* | 6/2017 | Huddleston, Jr. | B64C 39/024 |
| 2017/0275027 A1* | 9/2017 | Wirth | B64D 45/00 |
| 2017/0335828 A1* | 11/2017 | Müller | F03D 17/00 |
| 2020/0198806 A1* | 6/2020 | Wirth | B64F 5/60 |

* cited by examiner

SYSTEM AND METHOD FOR DATA RECORDING AND TRANSMISSION FOR PROPELLER BALANCING

TECHNICAL FIELD

The application relates generally to propeller-powered aircraft and, more particularly, to data recording and transmission for propeller balancing on propeller-powered aircraft.

BACKGROUND OF THE ART

Propeller powered aircraft, small and large, require propeller balancing at some point in time. Some require balancing more often than others.

Many systems require the aircraft to be on the ground to perform engine runs in order to collect the data needed for propeller balancing. This is not an effective solution as the ground data is not truly representative of inflight conditions. Other systems will collect data inflight and provide it to a ground station post-flight for analysis. However, such systems are programmed to gather data at specific points in time, which again does not consider specific operational conditions of the flight. Furthermore, calibration data for maintenance tasks, such as propeller balancing, has to be applied to an entire fleet of aircraft, without accounting for variation in propeller hardware.

Therefore, there is room for improvement.

SUMMARY

In one aspect, there is provided a data recording and transmission method for use in balancing a propeller of an aircraft. The method comprises operating the propeller in-flight, receiving, during operation of the propeller in-flight, vibration data associated with the propeller, retrieving, from a non-volatile memory on-board the aircraft, configuration data associated with the propeller, and transmitting the vibration data and the configuration data to a data processing device configured to determine a balancing solution for the propeller based one the vibration data and the configuration data.

In another aspect, there is provided a data recording and transmission system for use in balancing a propeller of an aircraft. The system comprises a processing unit provided in a data acquisition and transmission unit of the aircraft, and a memory communicatively coupled to the processing unit, the memory comprising a non-volatile memory. The memory comprises computer-readable program instructions executable by the processing unit for receiving, during operation of the propeller in-flight, vibration data associated with the propeller, retrieving, from a non-volatile memory on-board the aircraft, configuration data associated with the propeller, and transmitting the vibration data and the configuration data to a data processing device configured to determine a balancing solution for the propeller based on the vibration data and the configuration data.

In a further aspect, there is provided a non-transitory computer readable medium having stored thereon computer-readable program instructions for data recording and transmission for use in balancing a propeller of an aircraft. The instructions are executable by a processor for receiving, during operation of the propeller in-flight, vibration data associated with the propeller, retrieving, from a non-volatile memory on-board the aircraft, configuration data associated with the propeller, and transmitting the vibration data and the configuration data to a data processing device configured to determine a balancing solution for the propeller based on the vibration data and the configuration data.

DESCRIPTION OF THE DRAWINGS

Reference is now made to the accompanying figures in which.

DETAILED DESCRIPTION

Figure 1:
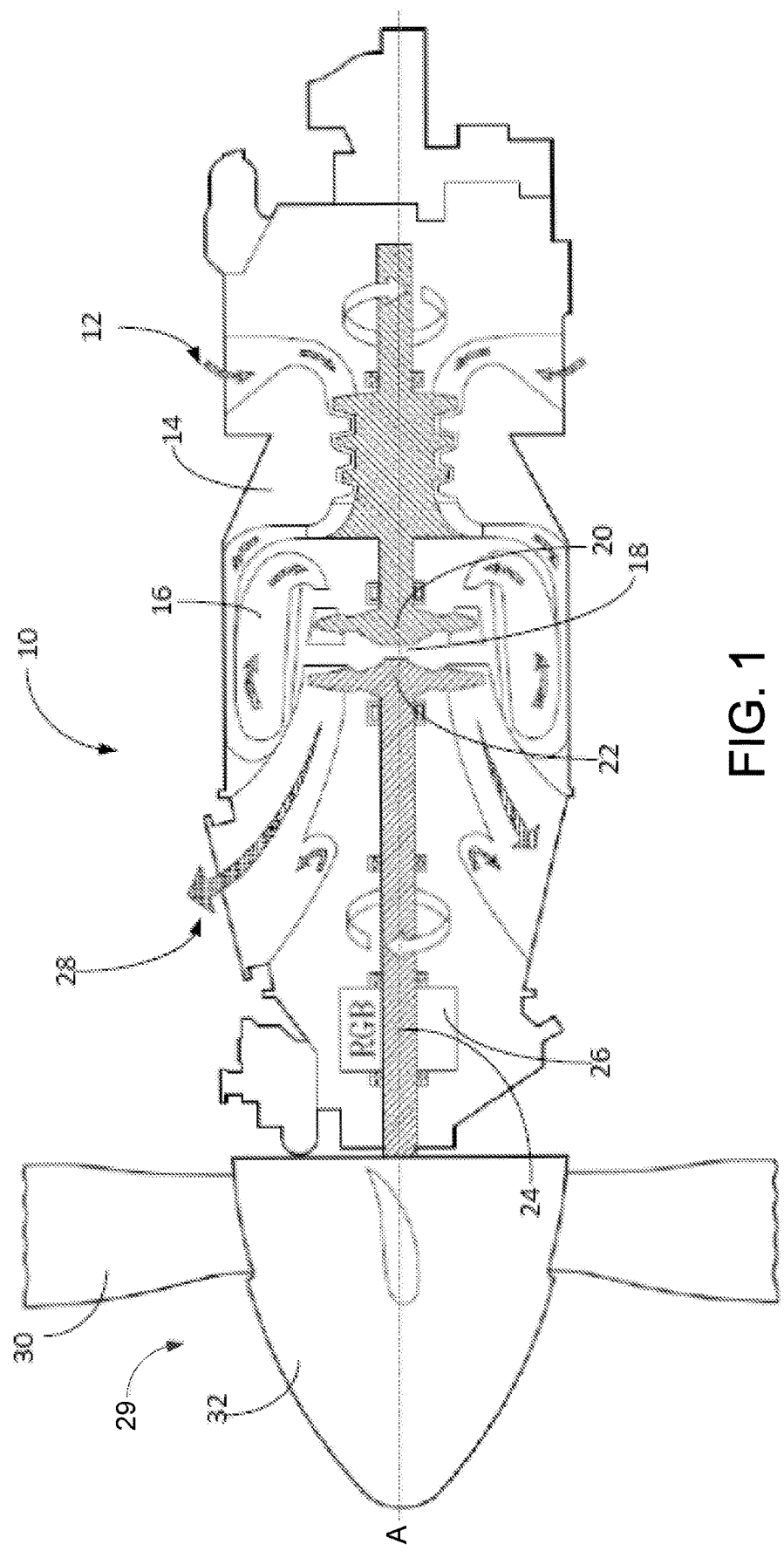
FIG. 1 is a schematic cross-sectional view of a gas turbine engine, in accordance with one embodiment.

There is described herein systems and methods for data recording and transmission for use in performing maintenance tasks, and more specifically propeller balancing, on propeller-powered aircraft. The aircraft is equipped with an engine, such as a turboprop engine having a propeller. FIG. 1 illustrates an exemplary gas turbine engine 10 of a type preferably provided for use in subsonic flight, generally comprising in serial flow communication an inlet 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The turbine section 18 illustratively comprises a compressor turbine 20, which drives the compressor assembly and accessories, and at least one power or free turbine 22, which is independent from the compressor turbine 20 and drives the rotor shaft 24 through a reduction gearbox (RGB) 26. Hot gases may then be evacuated through exhaust stubs 28. Other configurations for a free turbine turboprop engine 10 may also apply.

A propeller 29 through which ambient air is propelled, is composed of a propeller hub 32 and blades 30. The propeller 29 converts rotary motion from the engine 10 to provide propulsive force to the aircraft.

Figure 2:
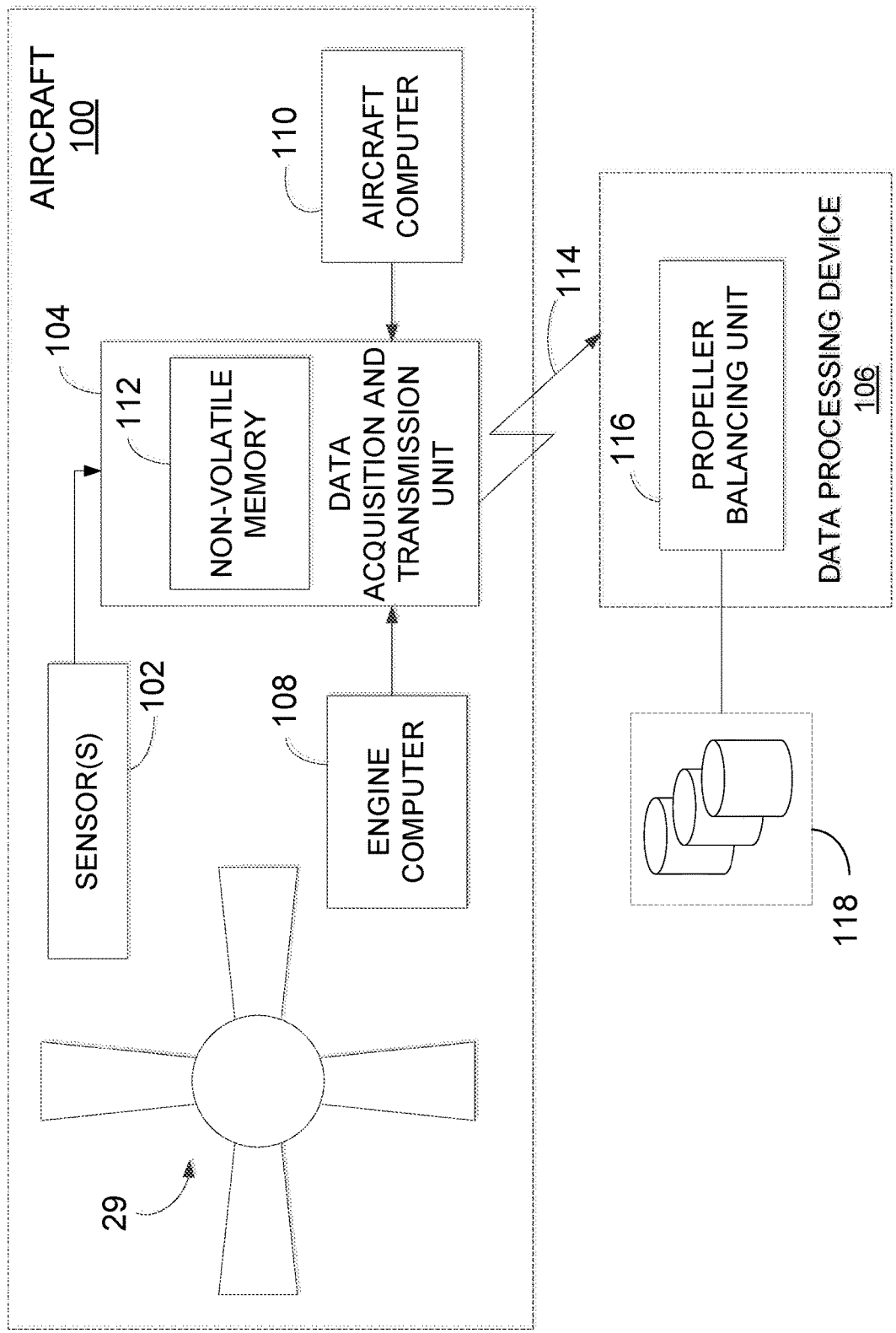
FIG. 2 is a schematic diagram of an aircraft system, including a propeller balancing unit, in accordance with one embodiment.

FIG. 2 illustrates an example aircraft 100, which may be any type of propeller-driven aircraft 100. At least one sensor 102 is provided per engine (reference 10 in FIG. 1) of the aircraft 100, for collecting measurement data from the propeller 29 while the aircraft is in flight. The sensor(s) 102 may comprise, but are not limited to, at least one accelerometer, at least one phase angle sensor, at least one torque sensor, and/or at least one altitude meter. The measurement data collected by the sensor(s) 102 may be referred to as "full-flight data". As used herein, the term "full-flight data" refers to data (aircraft and engine operational data parameters) which is collected in real-time, throughout the duration of a flight of the aircraft 100, to provide a complete indication of engine performance during flight, as opposed to snapshot data, which is collected at one point in time during flight and is not real-time. In one embodiment, the measurement data corresponds to the acceleration of the front of the engine 10 in a direction normal to the propeller shaft. When the propeller 29 is out of balance, as the center of mass rotates around the axis of rotation, the resulting centripetal force tries to pull the propeller 29 towards the center of mass. This rotating imbalance force acts on the mass of the engine 10 and propeller 29 and accelerates it. This acceleration is measured by the sensor(s) 102.

The sensor(s) 102 may be mounted directly on the engine 10, proximate to the propeller 29, in order to measure the acceleration of the propeller 29 as well as the phase angle of the propeller shaft. The installation may be permanent or temporary. A permanent mount may be performed during manufacture of the engine 10. When the aircraft 100 is assembled, the sensor(s) 102 may be connected to an existing aircraft harness (not shown). One or more additional cables, adapters, connectors, and/or harnesses may be added in order to connect the sensor(s) 102 to the existing aircraft harness. A temporary mount may be performed after manufacture of the engine 10 and/or after aircraft assembly, such as during aircraft maintenance.

The measurement data collected by the sensor(s) 102 may be transmitted to an aircraft-mounted electronic device (referred to herein as a "data acquisition and transmission unit" 104), via the existing aircraft harness and/or additional cables, adapters, connectors, and/or harnesses. Alternatively, transmission of the data collected by the sensor(s) 102 is performed wirelessly. Therefore, the sensor(s) 102 may be configured for providing the measurement data to the data acquisition and transmission unit 104 via any suitable wired or wireless communication path, including RS-232, USB, USB 2.0, USB 3.0, USB-C, SATA, e-SATA, Thunderbolt™, Ethernet, Wi-Fi, Zigbee™, Bluetooth™, and the like.

The data acquisition and transmission unit 104 may take various forms, such as a Flight-data Acquisition, Storage, and Transmission (FAST™) box, as manufactured by Pratt & Whitney Canada, or any other computer-controlled unit that receives data from various aircraft and engine systems and sensors. In one embodiment, the data acquisition and transmission unit 104 transmits the received data off-aircraft to one (or more) data processing device(s) as in 106. As will be discussed further below, the data processing device 106 is configured to determine a propeller balancing solution for the aircraft 100. In one embodiment, as described in co-owned U.S. patent application Ser. No. 17/073,774, the entire contents of which are hereby incorporated by reference, the data processing device 106 is further configured to make the propeller balancing solution as determined accessible to one or more client devices (not shown) adapted to communicate over at least one network capable of carrying data (such as the Internet, a cellular network, Wi-Fi, or others known to those skilled in the art). The client device(s) may comprise any portable or handheld communication device, such as a smartphone, a desktop computer, a portable computer, a tablet, or the like.

In some embodiments, the data acquisition and transmission unit 104 may be configured to store the data received from the aircraft systems and sensors in memory prior to transmitting the received data to the data processing device(s) 106, which in turn computes the propeller balancing solution. In yet another embodiment, the data acquisition and transmission unit 104 may be configured to store the received data and compute the propeller balancing solution on-board.

The data acquisition and transmission unit 104 may comprise one or more antenna, one or more processors, and a memory. The one or more antenna enable establishment of a connection (e.g., wireless) with the data processing device 106. The processor(s) may be coupled to a data bus of the aircraft 100 for receiving the measurement data and any other data from the aircraft and engine systems and sensors (e.g., from the sensor(s) 102). In some embodiments, the measurement data is transmitted to and received at the data acquisition and transmission unit 104 using the Aeronautical Radio Inc. (ARINC) 429 data transfer standard for aircraft avionics. Other data standards may also be used, including, but not limited to, ARINC 615, ARINC 717, UART RS-422, MIL-STD-1553, Ethernet, and ARINC 664 Ethernet. Any other suitable data standard may apply. It should be understood that, while FIG. 2 illustrates (for clarity purposes) a single data acquisition and transmission unit 104 having both data acquisition and data transmission functionalities, more than one unit as in 104 may be provided. For example, the aircraft 100 may comprise a data acquisition unit separate from the data transmission unit.

The illustrated data acquisition and transmission unit 104 is configured to process the measurement data received from the sensor(s) 102 in order to obtain vibration data for the engine 10 and/or the propeller 29. In one embodiment, the vibration data comprises propeller speed as well as phase angle and magnitude (or level) of engine vibration. Speed may be denoted as a Rotation Per Minute (RPM) of the propeller 29. The sensor(s) 102 may act as a tachometer to measure the RPM of the propeller 29. One or more additional sensors may also be provided for this purpose. Magnitude may be denoted as a peak velocity in units of Inches Per Second (IPS). The phase angle (denoted in degrees) is found by detecting when one particular propeller blade passes the sensor(s) 102, and corresponds to the relationship between the waveform of the vibration magnitude signal to the angular position of the propeller 29. In one embodiment, the data acquisition and transmission unit 104 may be configured to digitize the measurement data if received in analog form, and to determine the vibration data from the digitized data.

In some embodiments, a dedicated device (referred to herein as a "Propeller Balance Monitoring System" or PBMS, not shown) may be provided to pre-condition the propeller vibration and phase angle data for live streaming to the data acquisition and transmission unit 104. In particular, the PBMS may be configured to perform conversion of the measurement data from an analog form to a digitized form. The sensor(s) 102 are illustratively connected to the PBMS via a suitable harness. The PBMS may be integrated with the data acquisition and transmission unit 104 or provided separately threrefrom.

In one embodiment, the data acquisition and transmission unit 104 also receives data from an engine computer 108 and/or an aircraft computer 110. This data will be collectively referred to as aircraft data, and denote engine and/or aircraft performance parameters. The aircraft computer 110 may be an aircraft management controller (AMC), a flight management system (FMS), an aircraft digital computer system, or any other device used for computing inside an aircraft 100. The engine computer 108 may be any type of computing unit of an engine 10, such as an engine control unit (ECU), an engine electronic controller (EEC), an engine electronic control system, and a Full Authority Digital Engine Controller (FADEC). Data transmitted from the engine computer 108 and/or the aircraft computer 110 to the data acquisition and transmission unit 104 may be provided over a dedicated communication bus or any other existing communication system of the aircraft 100. Example data provided by the aircraft computer 110 comprises airspeed, altitude, stability, and position of the aircraft 100 at any point in time during a flight. Example data provided by the engine computer 108 comprises torque, speed, rating, torque stability, propeller speed stability, and compressor speed stability of the engine 10 at any point in time during engine operation.

It should be understood that the full-flight data provided to the data acquisition and transmission unit 104 (e.g., from the sensor(s) 102, the engine computer 108, and/or the aircraft computer 110) may comprise one or more hardware parameters including, but are not limited to, parameter(s) associated with the execution or operation of propeller hardware, such as propeller blades. For example, the hardware parameter(s) may comprise a propeller blade angle.

As illustrated in FIG. 2, the data acquisition and transmission unit 104 comprises a non-volatile memory (NVM) 112 configured to store therein configuration data associated with the propeller 29. In one embodiment, the configuration data is stored in an Extensible Markup Language (XML) file format. Other embodiments may apply. As used herein, propeller configuration data comprises data describing the physical state of the propeller 29. In one embodiment, the configuration data is related to one or more identifying parameters for the propeller 29 and to weight characteristics of the propeller 29.

The one or more identifying parameters may comprise, but are not limited to, a type of the propeller 29, a serial number of the propeller 29 and/or engine 10, and one or more part numbers for the propeller 29. The weight characteristics of the propeller 29 may comprise values and locations of balancing weights used to correct propeller imbalance. The weight characteristics may also have associated therewith one or more propeller balancing parameters (i.e. influence coefficients) that are stored in the NVM 112, as a lookup table or other suitable format. The influence coefficients provide an indication as to which corrective balancing weight(s) will have the most impact on correcting propeller imbalance. It should however be understood that, in some embodiments, the influence coefficients may be (alternatively or in addition) stored in a memory associated with the processing device 106 (e.g. in a data warehouse 118).

The influence coefficients stored in the NVM 112 may comprise generic and tuned (or customized) influence coefficients. The generic influence coefficients may be designed for an entire fleet of aircraft. In one embodiment, the propeller balancing unit 116 may be configured to fine-tune the generic influence coefficients according to the propeller configuration data retrieved from the NVM 112, such that the propeller balancing parameters are customized for the propeller 29 (i.e. specific to the propeller hardware and therefore unique per propeller configuration and aircraft operational conditions). The customized influence coefficients may then be sent from the data processing device 106 to the NVM 112 for storage.

For this purpose, the propeller balancing unit 116 is illustratively configured to monitor the propeller configuration and/or operational behaviours over time (e.g., over the course of several days, weeks, or months) and monitor the impact of the differences in propeller configuration and/or operational behaviours on the vibration level of the aircraft 100 (and accordingly on the propeller imbalance) in order to tune the influence coefficients. For example, monitoring of the propeller configuration and operational characteristics over two (2) months may indicate that installing a weight of 10 grams on a given blade of the propeller 29 consistently results in a decrease in propeller vibration by a magnitude of 1 IPS. Generic influence coefficients can be adjusted or tuned (to obtain customized influence coefficients) in the propeller balancing unit 116 to differentiate specific balance solutions dependent on selected propeller configurations and/or aircraft flight segment(s). The propeller balancing unit 116 may indeed use the customized influence coefficients to select the appropriate balancing weights to be used as part of the balancing solution for the propeller 29.

For purposes of computing a propeller balancing solution, the data acquisition and transmission unit 104 is configured to transmit the vibration data and the propeller configuration data retrieved from the NVM 112 to the data processing device 106 via a communication link 114. The vibration data and the propeller configuration data may be transmitted using any suitable communication protocol or means, such as Secure File Transfer Protocol (SFTP), text messaging, or the like. In one embodiment, the data acquisition and transmission unit 104 is configured to combine the vibration data and the propeller configuration data into a single (e.g., XML file) prior to transmission to the data processing device 106. In another embodiment, the vibration data and the propeller configuration data may be transmitted as two separate files, one for each dataset. In some embodiments, the data acquisition and transmission unit 104 may also be configured to transmit the aircraft data to the data processing device 106.

In one embodiment, the communication link 114 is wireless. The wireless communication may be established upon engine start up with the aircraft 100 parked, after completion of a flight mission of the aircraft 100, or after engine shutdown. In other embodiments, the communication link 114 may be wired (e.g., USB, Ethernet, or the like). For example, upon landing of the aircraft 100, the user may connect their client device 122 to the aircraft 100 using any suitable wired connection (e.g. USB, Ethernet, or the like) for the purpose of manually retrieving the vibration data and the propeller configuration data from the NVM 112 and downloading the retrieved data onto their client device. In some embodiments, a portable electronic device, such as a USB flash drive or other suitable data storage device, that is associated with the client device may be connected to a communication port of the aircraft 100 for downloading the vibration data and the propeller configuration data from the NVM 112. Other embodiments may apply.

In some embodiments, the vibration data and/or the propeller configuration data is transmitted to the data processing device 106 in real-time or at regular intervals during a flight mission of the aircraft 100, based on specific operational conditions. In other embodiments, the vibration data and the propeller configuration data is transmitted to the data processing device 106 at the end of at least one flight mission of the aircraft 100. The vibration data and the propeller configuration data may be transmitted to the data processing device 106 (for determining the balancing solution) at the end of every flight mission, after every other flight mission, or after any suitable number of flight missions of the aircraft 100, depending on the number of flight missions required to obtain full-flight data for the aircraft 100. For example, for an aircraft 100 that requires data to be collected over five (5) hours in order to perform propeller balancing, if a given flight mission of the aircraft 100 lasts three (3) hours only, the vibration data needs to be collected and transmitted over two (2) flight missions of the aircraft 100. Conversely, if the aircraft's flight mission lasts seven (7) hours, the vibration data needs only be collected and transmitted over one (1) flight mission for propeller balancing purposes.

The data processing device 106, and more particularly the propeller balancing unit 116, may then use the received data to determine the balancing solution for the propeller 29. The propeller balancing solution may in turn be made available to maintenance personnel for installation on the aircraft. In one embodiment, the provided information comprises at least one weight value and location for installation on the propeller balance rim.

The data processing device 106 may comprise a series of servers corresponding, but not limited, to a microserver, a web server, an application server, and a database server. In one embodiment, the data processing device 106 is a server provided on the ground (referred to herein as a "ground server"). It should however be understood that the methods and systems described herein may use cloud computing, such that the data processing device 106 may be a cloud server. Indeed, the systems and methods described herein may support Internet of Things (IoT) connectivity with a cloud data analytics platform. Distributed computing may also apply, such that the data processing device 106 may comprise a set of two or more servers. Any other suitable data processing device may apply. These servers are all represented by data processing device 106 in FIG. 2. In addition, it should be understood that, while the data processing device 106 is illustrated as being remote from the aircraft 100, the balancing solution may, in some embodiments, be determined on the aircraft 100, such that the data processing device 106 may be provided on-board the aircraft 100 (e.g., as part of the data acquisition and transmission unit 104) as described elsewhere.

As shown in FIG. 2, the data processing device 106 illustratively comprises a propeller balancing unit 116. It should be understood that the propeller balancing unit 116 may be provided directly on the data processing device 106, as illustrated, or separately therefrom. As will be discussed further below, the propeller balancing unit 116 determines a propeller balancing solution (or updates a previously computed balancing solution) using at least one balance equation (e.g., provided by the engine manufacturer), based on the full-flight vibration data and on the propeller configuration data received from the data acquisition and transmission unit 104. In one embodiment, determining the propeller balancing solution comprises determining a value and a placement location for at least one weight (or mass) to be added to (or removed from) the propeller 29 (i.e. placed on or removed from a propeller balance rim) to correct propeller imbalance (i.e. reduce vibration). The propeller balancing solution as determined by the propeller balancing unit 116 may then be transmitted (through the communication link 114) from the data processing device 106 to the NVM 112 for storage.

As understood by those skilled in the art, the propeller balance rim (not shown) is a ring that is coupled to the propeller 29 and which provides a number of balance weight locations each configured to receive therein a balancing weight (selected as part of the balancing solution) for correcting propeller imbalance. Pre-classified weights can indeed be mounted directly on the propeller balance rim in order to achieve an optimum propeller assembly balanced state. In one embodiment, each balance weight location is numbered in a counter-clockwise direction beginning with location 1 and ending with location 24.

In one embodiment, the propeller balancing unit 116 is further configured to use the propeller configuration data to tune the propeller balancing solution to customized propeller speed and/or torque ranges in each operational flight segment of the aircraft. In particular, the propeller balancing unit 116 may adjust the propeller balancing solution based on selected flight condition(s) (e.g., aircraft flight segment(s) and/or flight duration(s)) for which propeller balancing is to be effected. In other words, the propeller balancing unit 116 may provide a balancing solution that is specific to the selected flight condition(s) and the associated propeller rotational speed and torque range(s).

The at least one flight condition for which balancing is to be effected may vary from one flight mission to the next and may comprise any suitable flight segment(s) and any suitable number of flight hours, depending on the natural flight to flight variability observed in the recorded full-flight data. As used herein, the term "mission" refers to a flight to perform a specific task. The mission may be defined by various parameters, such as duration, destination, cargo, and any flying parameters to be used during the mission, such as propeller speed or maximum altitude. For example, operator X may have aircraft A and B fly at a propeller speed of 1050 RPM wile aircraft C flies at a propeller speed of 975 RPM. The value associated for the flight criteria "propeller speed" may therefore differ between aircraft A and B and aircraft C. In some embodiments, operator X may define a unique set of flight criteria and associated values for each flight of an aircraft as a function of the specific flight parameters of a given flight, such as propeller speeds, cruising altitudes, etc.

The flight condition(s) may be configurable and hence tunable per aircraft and/or engine application in order to obtain the most accurate and consistent operational trend. In one embodiment, the flight condition(s) may be provided as an input to the data processing device 106. A user (e.g., an operator of the aircraft 100) may indeed provide an indication of flight segment(s) and/or flight duration(s) for which propeller balancing is to be performed. In another embodiment, the flight condition(s) (e.g., the flight segment(s) and/or flight duration(s) during which propeller imbalance is most affected) may be automatically identified from the vibration data. The vibration data (retrieved from the NVM 112) may be compared (e.g., at the data acquisition and transmission unit 104 and/or at the processing device 106) to a predetermined threshold and one or more flight segments during which vibration is above the threshold (meaning that propeller imbalance is most affected) may be identified accordingly. It may then be determined for how long the aircraft 100 has been operating at the excessive vibration level in order to determine the flight duration(s).

The threshold may be determined by an operator of the aircraft 100. The user may indeed provide an indication of the threshold at which propeller balancing is to be performed and the propeller balancing solution may then be computed by the propeller balancing unit 116 once the user-defined threshold is reached. The threshold may also be set according to regional and/or other types of aircraft regulations or as a function of the aircraft's mission or of a number of aircraft parameters (e.g., aircraft size, engine type, etc.). It should however be understood that, in other embodiments, the propeller balancing solution may be computed for any level of vibration, thus alleviating the need for comparison of the vibration magnitude to a threshold.

In one embodiment, the flight condition correspond to a stable cruise condition. In another embodiment, the identified flight segment(s) correspond to constant climb phases of flight. Other suitable flight conditions (e.g., ground operation) may apply. As understood by those skilled in the art, a constant climb phase of flight corresponds to a flight phase during which the aircraft 100 climbs to a given altitude at a constant climb rate. A stable cruise condition corresponds to an operating condition of the aircraft 100 during which certain flight criteria, which may correspond to engine parameters and/or aircraft parameters, are attained. Stable cruise condition may be operator-specific. Example aircraft parameters are minimum altitude, stability duration, minimum calibrated air speed, altitude stability, and calibrated airspeed stability. Example engine parameters are propeller rotational speed, engine torque, engine rating, engine torque stability, engine propeller speed (Np) stability, and engine compressor speed (Nh) stability.

In one embodiment, the data processing device 106 may update the configuration data associated with the propeller 29, such that the information stored in the data acquisition and transmission unit 104, particularly in the NVM 112, is synchronized with information from the data processing device 106. This may include, for example, any update to the propeller serial number, propeller part number, and/or propeller type or any update to a previously computed propeller balancing solution, the update being received at the data processing device 106 (e.g., from a user, via their client device). The update(s) may be sent to the data acquisition and transmission unit 104, through the communication link 114. The data acquisition and transmission unit 104 may then modify the data (e.g. the propeller configuration data) stored in the NVM 112 according to the update(s).

The data processing device 106 may also optionally send the propeller balancing solution determined by the propeller balance unit 116 to the data warehouse 118, which maintains a history of propeller maintenance actions (and more specifically balancing solutions) over time. In one embodiment, the data warehouse 118 stores counterweight mass values and locations associated with each propeller balancing solution determined by the propeller balancing unit 116. The data warehouse 118 may further store the existing propeller configuration (based on information obtained from the data acquisition and transmission unit 104), along with the newly determined propeller balancing solution. The data warehouse 118 may also store the balancing parameter(s) (i.e. the generic and/or the customized influence coefficients) associated with the propeller 29. In addition, the data warehouse 118 may store propeller maintenance data comprising one or more maintenance records for the propeller 29. The maintenance record(s) may be indicative of date(s) and time(s) at which propeller maintenance has been performed. For example, the maintenance record(s) may indicate date(s) and time(s) at which propeller part, such as propeller blades, have been changed.

In one embodiment, the data processing device 106 may retrieve the propeller maintenance data (e.g., the maintenance records associated with the propeller 29) from the data warehouse 118 and send it to the data acquisition and transmission unit 104, through the communication link 114. The data acquisition and transmission unit 104 may then store the propeller maintenance data in the NVM 112, along with to the propeller configuration data, for the purpose of maintaining a propeller maintenance history over time on-board the data acquisition and transmission unit 104.

The data warehouse 118 described herein may be provided as collections of data or information organized for rapid search and retrieval by a computer. It is structured to facilitate storage, retrieval, modification, and deletion of data in conjunction with various data-processing operations. The data warehouse 118 may consist of a file or sets of files that can be broken down into records, each of which consists of one or more fields. Database information may be retrieved through queries using keywords and sorting commands, in order to rapidly search, rearrange, group, and select the field. The data warehouse 118 may be any organization of data on a data storage medium, such as one or more servers. It should be understood that the data warehouse 118 may also be provided in a cloud-based server-less environment.

In some embodiments, the data processing device 106 (including the propeller balancing unit 116) may be implemented in hardware, using analog and/or digital circuit components. For example, the data processing device 106 may be provided as an application-specific integrated circuit (ASIC) or a field programmable gate array (FPGA). In some embodiments, the data processing device 106 is provided as a non-transitory computer readable medium having stored thereon program code executable by a processor for carrying out the instructions of the program code.

Figure 3:
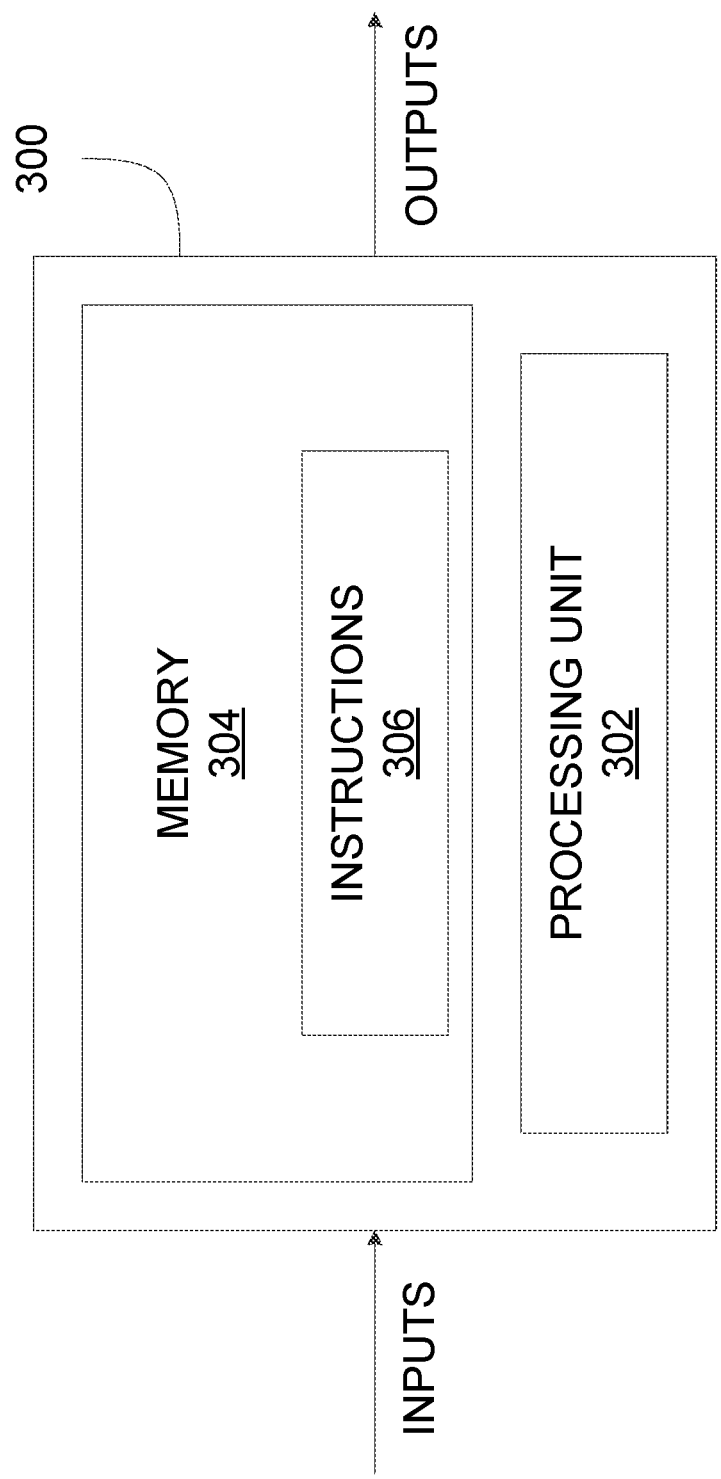
FIG. 3 is a block diagram of a computing device, in accordance with an illustrative embodiment.

In other embodiments, the data processing device 106 is implemented using a combination of hardware and software components, as illustrated in FIG. 3. In particular, FIG. 3 is an example embodiment of a computing device 300 that may be used for implementing the data processing device 106. As depicted, the computing device 300 includes at least one processing unit 302 and memory 304. The memory 304 has stored therein computer-executable instructions 306. The processing unit 302 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 304 may comprise any suitable known or other machine-readable storage medium. The memory 304 may comprise non-transitory computer readable storage medium, for example, but not limited to, an electronic, magnetic, optical, electromagnetic, infrared, or semiconductor system, apparatus, or device, or any suitable combination of the foregoing. The memory 304 may include a suitable combination of any type of computer memory that is located either internally or externally to computing device 300, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 304 may comprise any storage means (e.g., devices) suitable for retrievably storing machine-readable instructions 306 executable by processing unit 302.

The instructions 306 may be implemented in a high level procedural or object oriented programming or scripting language, or a combination thereof, to communicate with or assist in the operation of a computer system, for example the data processing device 106. Alternatively, the instructions 306 may be implemented in assembly or machine language. The language may be a compiled or interpreted language. The instructions 306 may be readable by a general or special-purpose programmable computer.

Figure 4:
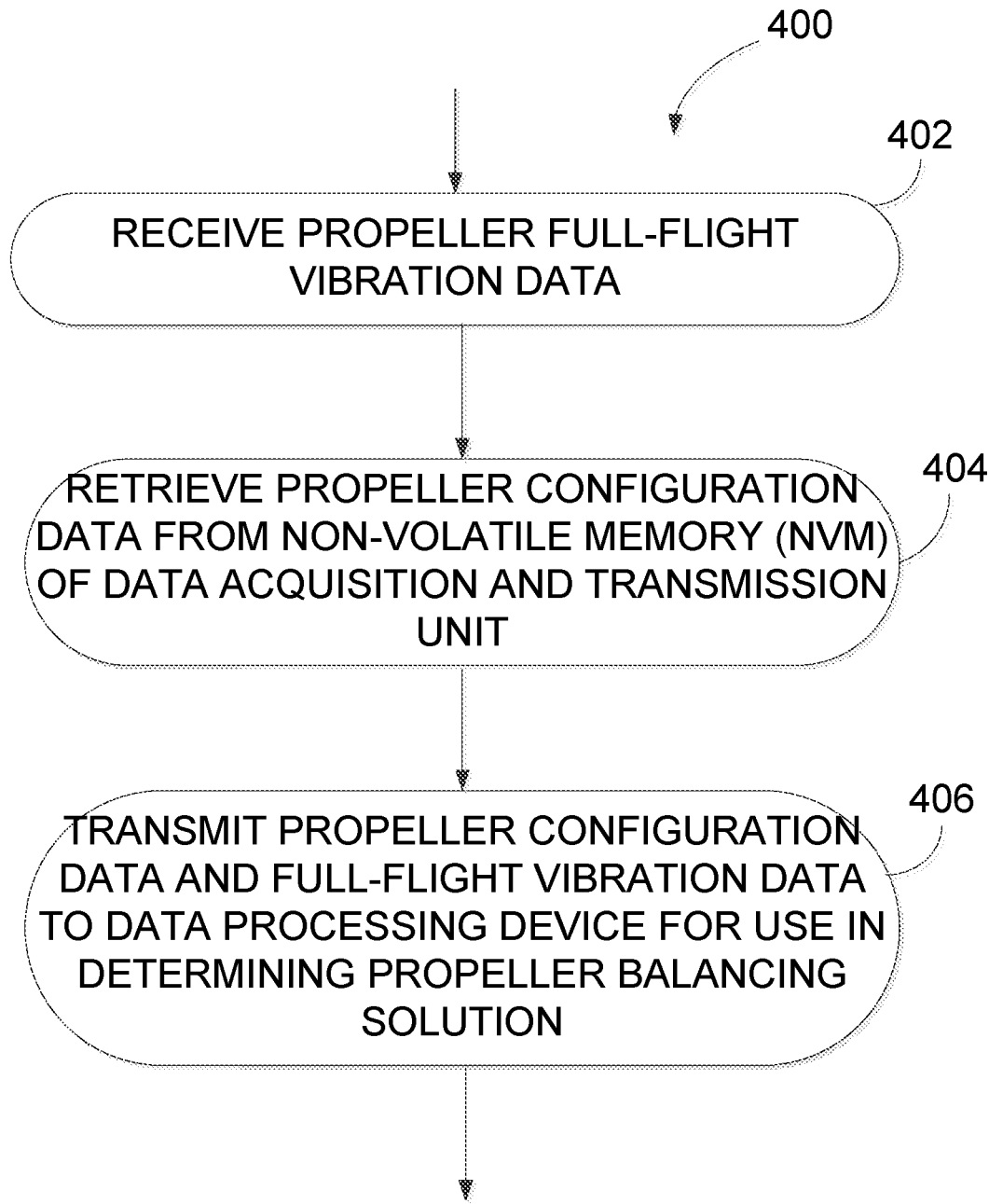
FIG. 4 is a flowchart of a method for data recording and transmission for propeller balancing, in accordance with one embodiment.

Referring now to FIG. 4, there is illustrated a flowchart for an example embodiment of a method 400 for data recording and transmission for use in propeller balancing, as performed by the instructions 306 when executed by the processing unit 302 of the computing device 300 (e.g., as performed at the data processing device 106 of FIG. 2). The method 400 comprises, at step 402, receiving propeller full-flight vibration data. The full-flight propeller vibration data is data collected in real-time, during operation of the propeller in-flight, in the manner described herein above. The next step 404 is to store propeller configuration data in a non-volatile memory provided on-board of a data acquisition and transmission unit of an aircraft. As described herein above, the propeller configuration data illustratively comprises data related to propeller identifying parameter(s) and to propeller weight characteristics. It should be understood that the order of steps 402 and 404 may be interchanged and that steps 402 and 404 may also be performed simultaneously rather than in sequence.

At step 406, the propeller configuration data and the full-flight vibration data are then transmitted to a data processing device for use in determining a propeller balancing solution, using at least one balance equation. In one embodiment, step 406 comprises tuning propeller balancing parameter(s) (i.e. influence coefficient(s)) designed for an entire fleet of aircraft according to the propeller configuration data retrieved from the non-volatile memory, such that the propeller balancing parameter(s) are customized for the propeller and aircraft. Step 406 may further comprise adjusting the propeller balancing solution according to the selected flight condition(s), which may, in some embodiments, be identified based on the propeller configuration data. The balancing solution is then made available to maintenance personnel for signaling a balancing need.

As discussed above, in some embodiments, method 400 may further comprise updating the propeller configuration data. For this purpose, the data processing device may send an update to the data acquisition and transmission unit 104, which may in turn modify the propeller configuration data stored in the non-volatile memory accordingly.

In some embodiments, method 400 may comprise storing the balancing solution as determined in the non-volatile memory. Method 400 may also comprise storing maintenance data in the non-volatile memory for maintaining a history of propeller maintenance over time. For this purpose, the data processing device may retrieve the propeller maintenance data from a data warehouse and send the retrieved propeller maintenance data to the data acquisition and transmission unit. The data acquisition and transmission unit may then store the propeller maintenance data in the non-volatile memory 112 along with the propeller configuration data.

In one embodiment, using the systems and methods described herein may allow to track operational data and maintenance actions on particular propeller hardware, without the need to physically look at the propeller hardware. In this manner, variation in propeller hardware may be taken into account when performing maintenance actions, such as propeller balancing. The systems and methods described herein may also allow to fine tune propeller balancing parameters (e.g. influence coefficients) to a specific set of hardware, rather than assuming that the balancing parameters are the same for an aircraft entire fleet. As discussed herein above, the systems and methods described herein may also enable for the propeller balance solution to be tuned to customized propeller speed and/or torque ranges in each operational flight segment of the aircraft.

In one embodiment, using the systems and methods described herein, may alleviate the need for performing engine ground runs to verify vibration levels before and after a propeller balance maintenance action is performed. In one embodiment, using the systems and methods described herein, may also alleviate the need for connecting expensive ground support equipment to the aircraft 100 at the time of performing a propeller balance maintenance action. In one embodiment, using the systems and methods described herein, may further alleviate the need for changing the sensor(s) used to support propeller balancing. In some embodiments, using the systems and methods described herein, it may become possible to conduct propeller balancing without having to physically look at the propeller hardware to identify the current propeller configuration (e.g. counterweight masses and locations). In some embodiments, using the systems and methods described herein may also enable the calculation of a propeller balancing solution before the aircraft returns to the hangar, and may allow to feed the balancing solution to maintenance personnel in order to prepare for proactive maintenance actions.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A data recording and transmission method for use in balancing a propeller of an aircraft, the method comprising:
   operating the propeller in-flight;
   receiving, during operation of the propeller in-flight, vibration data associated with the propeller;
   storing configuration data associated with the propeller in a non-volatile memory of an engine data acquisition and diagnostic device on-board the aircraft;
   retrieving, from the non-volatile memory on-board the aircraft, the configuration data associated with the propeller;
   transmitting the vibration data and the configuration data to a data processing device configured to determine a balancing solution for the propeller based on the vibration data and the configuration data;
   receiving, from the data processing device, at least one update to the configuration data; and
   modifying the configuration data stored in the non-volatile memory according to the at least one update.

2. The method of claim 1, wherein the vibration data and the configuration data is transmitted to the data processing device through a wireless transmission.

3. The method of claim 1, wherein the configuration data is transmitted to the data processing device for use by the data processing device in tuning, according to the configuration data, at least one balancing parameter for the propeller, the at least one balancing parameter used in determining the balancing solution.

4. The method of claim 3, wherein the vibration data and the configuration data is transmitted to the data processing device for use in determining the balancing solution comprising identifying a value for at least one weight and a placement location for the at least one weight for correcting an imbalance of the propeller, and further wherein the configuration data is transmitted to the data processing device for use by the data processing device in tuning at least one influence coefficient according to the configuration data, the at least one influence coefficient indicative of an impact of the at least one weight on correcting the imbalance of the propeller.

5. The method of claim 1, wherein retrieving the configuration data from the non-volatile memory comprises retrieving at least one identifying parameter for the propeller and at least one weight characteristic of the propeller.

6. The method of claim 5, wherein retrieving the at least one identifying parameter comprises retrieving at least one of a type, a serial number, and at least one part number associated with the propeller.

7. The method of claim 1, further comprising:
receiving, from the data processing device, maintenance data associated with the propeller; and
storing the maintenance data in the non-volatile memory in association with the configuration data.

8. The method of claim 1, wherein the vibration data and the configuration data is transmitted to the data processing device at the end of every flight of the aircraft.

9. A data recording and transmission system for use in balancing a propeller of an aircraft, the system comprising:
a processing unit provided in a data acquisition and transmission unit of the aircraft; and
a memory communicatively coupled to the processing unit, the memory comprising a non-volatile memory, the memory comprising computer-readable program instructions executable by the processing unit for:
receiving, during operation of the propeller in-flight, vibration data associated with the propeller;
storing configuration data associated with the propeller in a non-volatile memory on-board the aircraft;
retrieving, from the non-volatile memory on-board the aircraft, the configuration data associated with the propeller;
transmitting the vibration data and the configuration data to a data processing device configured to determine a balancing solution for the propeller based on the vibration data and the configuration data;
receiving, from the data processing device, at least one update to the configuration data; and
modifying the configuration data stored in the non-volatile memory according to the at least one update.

10. The system of claim 9, wherein the instructions are executable by the processing unit for transmitting the configuration data to the data processing device for use by the data processing device in tuning, according to the configuration data, at least one balancing parameter for the propeller, the at least one balancing parameter used in determining the balancing solution.

11. The system of claim 10, wherein the instructions are executable by the processing unit for transmitting the vibration data and the configuration data to the data processing device for use in determining the balancing solution comprising identifying a value for at least one weight and a placement location for the at least one weight for correcting an imbalance of the propeller, and further wherein the instructions are executable by the processing unit for transmitting the configuration data to the data processing device for use by the data processing device in tuning at least one influence coefficient according to the configuration data, the at least one influence coefficient indicative of an impact of the at least one weight on correcting the imbalance of the propeller.

12. The system of claim 9, wherein the instructions are executable by the processing unit for retrieving the configuration data from the non-volatile memory comprising retrieving at least one identifying parameter for the propeller and at least one weight characteristic of the propeller.

13. The system of claim 12, wherein the instructions are executable by the processing unit for retrieving the at least one identifying parameter comprising retrieving at least one of a type, a serial number, and at least one part number associated with the propeller.

14. The system of claim 9, wherein the instructions are executable by the processing unit for:
receiving, from the data processing device, maintenance data associated with the propeller; and
storing the maintenance data in the non-volatile memory in association with the configuration data.

15. The system of claim 9, wherein the instructions are executable by the processing unit for transmitting the vibration data and the configuration data to the data processing device through a wireless transmission, at the end of every flight of the aircraft.

16. A non-transitory computer readable medium having stored thereon computer-readable program instructions for data recording and transmission for use in balancing a propeller of an aircraft, the instructions executable by a processor for:
receiving, during operation of the propeller in-flight, vibration data associated with the propeller;
storing configuration data associated with the propeller in a non-volatile memory of an engine data acquisition and diagnostic device on-board the aircraft;
retrieving, from the non-volatile memory on-board the aircraft, the configuration data associated with the propeller;
transmitting the vibration data and the configuration data to a data processing device configured to determine a balancing solution for the propeller based on the vibration data and the configuration data;
receiving, from the data processing device, at least one update to the configuration data; and
modifying the configuration data stored in the non-volatile memory according to the at least one update.

* * * * *